United States Patent [19]

Ely et al.

[11] Patent Number: 4,480,183

[45] Date of Patent: Oct. 30, 1984

[54] MULTI-PLANE OPTICAL MEMBRANE SWITCH APPARATUS

[75] Inventors: Richard I. Ely, Orange Park; Wunnava V. Subbarao, Miami, both of Fla.

[73] Assignee: Burroughs Corporation, Detroit, Mich.

[21] Appl. No.: 358,823

[22] Filed: Mar. 16, 1982

[51] Int. Cl.³ .............................................. G02B 5/14
[52] U.S. Cl. ................................ 250/227; 340/365 P
[58] Field of Search .............. 250/216, 227, 229, 221; 350/96.15, 96.16, 96.18, 96.12; 340/365 P; 73/705; 400/474, 479, 479.2

[56] References Cited

U.S. PATENT DOCUMENTS 3,982,123  9/1976  Goell et al. .................... 250/216
4,013,342  3/1977  Narodny ..................... 340/365 P
4,360,247 11/1982  Beasley ........................... 250/227
4,402,568  9/1983  Kulich et al. .................. 350/96.15

*Primary Examiner*—David C. Nelms
*Attorney, Agent, or Firm*—Carl Fissell, Jr.; Edmund M. Chung; Kevin R. Peterson

[57] ABSTRACT

A multi-plane optical membrane switch for use for example in a keyboard matrix is formed by two flat, planar, clear, plastic members disposed in parallel, separated relationship and each having individual light conducting guides or channels thereon. The channels of the lower plane are disposed at right angles to the channels of the upper plane. The upper set of light guides includes integral, gently curving coupler taps disposed at the intersection of the upper and lower guides for coupling the light from the lower planar guide channels into the upper guide channels when the two channel intersections are pressed together by the key top effectively switching the light from the lower to the upper channels.

5 Claims, 4 Drawing Figures

MULTI-PLANE OPTICAL MEMBRANE SWITCH APPARATUS

CROSS REFERENCE TO RELATED APPLICATIONS

The present application is related to the following listed applications dealing with similar subject matter all assigned to the same assignee as the present application and filed concurrently herewith.

"FIBER WRAP KEYBOARD AND SWITCH", U.S. Ser. No. 358,825, filed Mar. 16, 1982 in the names of Wunnava V. Subbarao, Richard I. Ely, Carl E. Mosier and James E. Andree;

"SINGLE PLANE OPTICAL MEMBRANE SWITCH AND KEYBOARD", U.S. Ser. No. 358,822, filed Mar. 16, 1982, in the name of Richard I. Ely;

"MOLDED OPTICAL KEYBOARD HAVING FIBER OPTIC KEYS", U.S. Ser. No. 358,824, filed Mar. 16, 1982, in the names of Wunnava V. Subbarao, Richard I. Ely and Carl E. Mosier;

"MOLDED OPTICAL WAVEGUIDE SWITCHING APPARATUS", U.S. Ser. No. 358,826, filed Mar. 16, 1982, in the name of Richard I. Ely.

BACKGROUND OF THE INVENTION

1. Field of the Invention

The present invention relates to photo-optical switching devices and more specifically to multiplane optical membrane switches for use in keyboard matrix arrays.

2. Description of the Prior Art

Prior art electrical membrane switching apparatus generally utilizes an electrically conductive coating on the opposite confronting surfaces of two slightly separated membranes. When the two membranes are pressed together electrical contact is made between the two conducting surfaces. If the conductive coatings are arranged in an array or matrix with one set of conductors at right angles to the other opposite set of conductors it is possible to form a keyboard with keys disposed at the intersections thereof.

Such keyboards suffer from certain deficiencies not the least of which is the fact that they radiate electromagnetic energy and are susceptible to electromagnetic interference (EMI). By employing optically conducting membranes the EMI problems are eliminated, in as much as there are no electrical contacts to be made.

SUMMARY OF THE INVENTION

The present invention provides an optically conductive keyboard membrane switch mechanism for use for example in keyboard applications among others. Two vertically displaced and separated planar, flat, sheet like membranes are each provided with a plurality of light conducting channels on one surface thereof. The channels of the upper membrane member are arranged to overlay the channels of the lower membrane member. For example, the lower membrane may have horizontal or x row channels thereon while the upper membrane may have vertical or y column channels thereon. The upper planar channel carrying members also include individual taps or optically conductive tails that intersect or overlap the optical channels of the lower membrane.

An optical switch structure is formed by placing a vertically movable key pad or key top over each tap such that depression of a key causes the upper channel intersecting area to contact the lower channel intersecting area.

A light source is disposed at the entering portion or end of each horizontal x row light conducting lower channel member while a light detector is located at the light exiting portion or end of each vertical column upper light conductor or channel member. When the taps are pressed against the horizontal channels light is conducted from the bottom channel to the top channel. This effect is the result of the two channels (upper and lower) having the same index of refraction such that when they are in contact (due to the key depression) there is no discontinuity in the index of refraction and thus light can be passed from the lower to the upper channel or light guide.

DESCRIPTION OF THE PREFERRED EMBODIMENT

Figure 1:
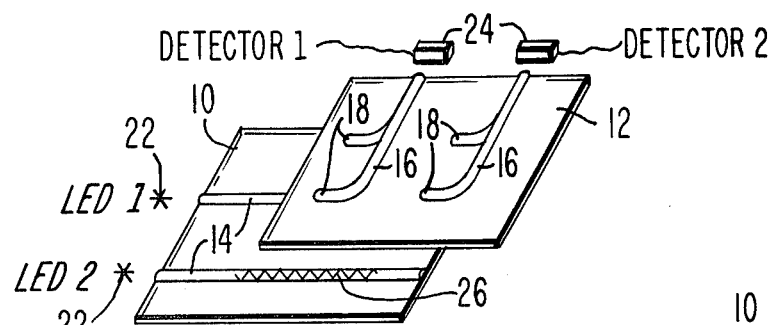
FIG. 1 is an isometric view (not to scale) of a four conductor membrane switch structure.
Figure 2:
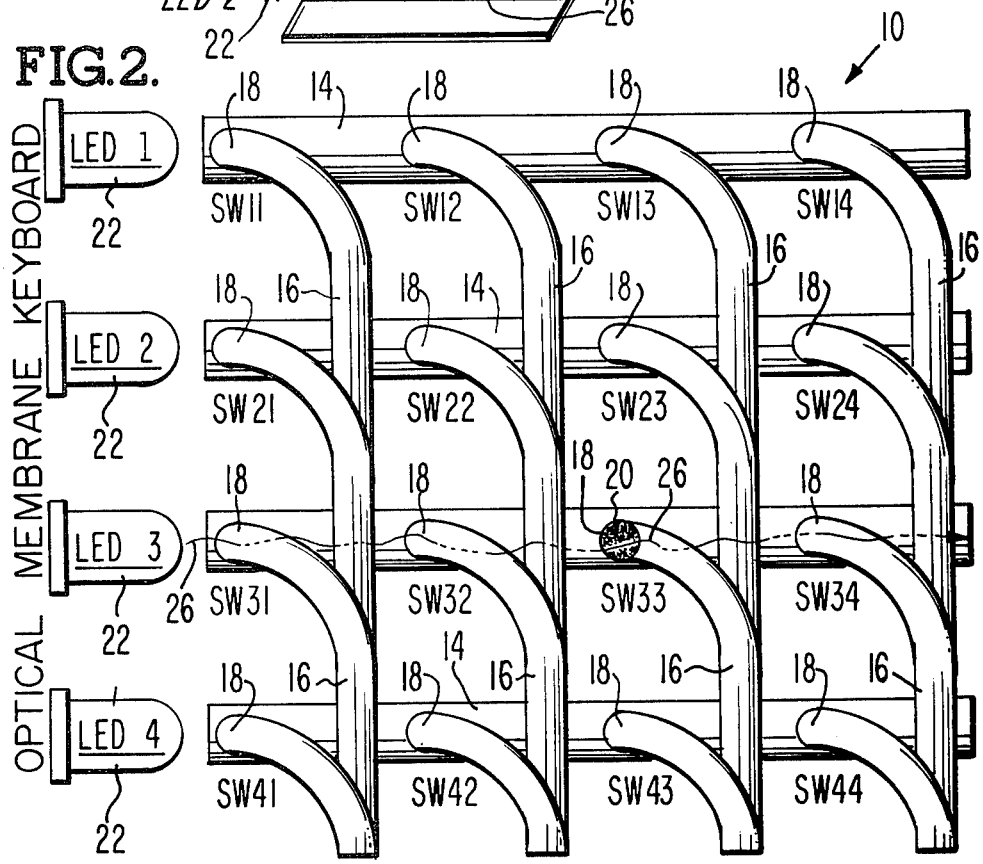
FIG. 2 is a top plan view (greatly enlarged and not to scale) of a keyboard matrix array incorporating the structure of FIG. 1.
Figure 3:
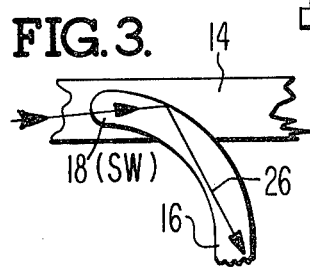
FIG. 3 is an enlarged view of a portion of the array of FIG. 2 illustrating the tap area thereon.
Figure 4:
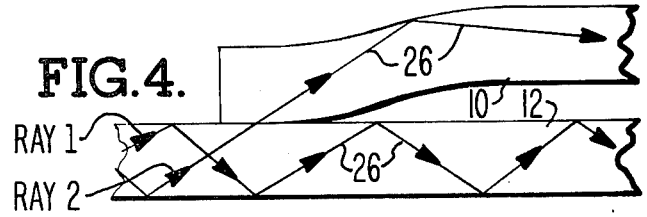
FIG. 4 is a schematic view illustrating two light ray paths from a lower to an upper channel according to the invention.

Many types of glass and clear plastic when fabricated in the form of this membranes exhibit the property of being capable of transmitting light into and through the material. Lexan, a clear plastic manufactured by General Electric Corporation of New York, USA exhibits such properties and has been successfully employed in the subject invention. Lexan is the trademark of the General Electric Company.

Two planar flat, thin, membrane-like sheets 10 and 12 of Lexan are arranged in spaced apart, parallel relation. A matrix array of this material comprises a first horizontal x row of fiber optical channels or light guides 14 disposed on the lower sheet 10 as by being embedded or pressed therein with a second vertical column set of light guides 16 disposed on the upper sheet 12 as by being embedded or pressed therein at right angles to the guides 14.

It has been discovered and demonstrated that when the upper light guides 16 are pressed into contact with the lower light guides 14 light is conductively coupled from one channel or guide into the other i.e. from the lower guides 14 to the upper guides 16. In order to more effectively utilize the light coupling phenomena, light guide couplers or taps 18, gently curving away from each vertical column in the area of the horizontal row channel intersections are formed from each vertical light guide 16 as seen in the FIG. 1.

By arranging a key top 20 over each coupler tap 18 the array or matrix can be made to act as a keyboard. Light generating means 22, such as light emitting diodes (LEDs) are located at each horizontal row input end as in FIG. 1. Light detectors or receptors 24, such as phototransistors or photo diodes are disposed at the end of each vertical column. Depression of any key 20 in a row 12 will cause light 26 from the photo generator 22 to couple up into the selected column guide 16 and activate its respective light receptor 24.

Light coupling from the x row to the y column, as the result of the contact between the intersecting tap and row guide is due to the fact that the two channels have the same index of refraction and when the two are brought into contact there is no discontinuity in the index of refraction so that the light is obliged to pass into the upper channel or guide from the lower channel.

This invention provides a relatively inexpensive keyboard array of easily formed optical switch devices. For practical purposes no moving parts are employed and in fact nothing moves but the upper plane intersecting point as it contacts the lower plane intersecting point. This construction effectively reduces the number of parts required in the device as well as the fabrication time for assembly thereof.

What we claim is:

1. Multi-plane optical membrane switch apparatus comprising:
    a first clear, semi-rigid, membrane-like, plastic member;
    a second clear, semi-rigid, membrane-like, plastic member disposed in spaced apart parallel relation to said first plastic member;
    a plurality of fiber optic channel plastic members disposed on said first plastic membrane-like member;
    a plurality of fiber optic channel forming members disposed on said second plastic member at right angles to said first plurality of fiber optic channel forming members;
    light generating means at one end of each one of said first plurality of fiber optic channel members;
    light receiving means at one end of each one of said second plurality of channel members; and
    means for applying pressure to the intersecting areas of said first and second optic channel members effective to couple light from one of the first to one of the second channel members.

2. The invention in accordance with claim 1 wherein said pressure applying means comprises individual keys including identifying indicia providing a keyboard matrix for operator manipulation.

3. The invention in accordance with claim 1 further including a tap member extending within said intersecting area horizontal row channel to a vertical column channel for coupling light from the horizontal to the vertical channel members.

4. The invention in accordance with claim 3 wherein each said tap is gently radially curved from a channel forming member of said first membrane-like member to a channel forming member of said second membrane-like member effective to couple light from the light generating means of a row channel to the light receiving means of a vertical column channel.

5. The invention in accordance with claim 1 wherein said pressure applying means is disposed over each of the intersecting areas of said first and second fiber optic channel members such that pressure selectively applied to a respective intersecting area causes a first fiber optic guide member to contact a second fiber optic guide member effectively coupling light from a horizontal to a vertical channel member.

* * * * *